United States Patent [19]

George et al.

[11] 4,357,387

[45] Nov. 2, 1982

[54] FLAME RESISTANT INSULATING FABRIC COMPOSITIONS PREPARED BY PLASMA SPRAYING

[75] Inventors: Stephen George; Thomas H. George, both of Clinton, N.J.

[73] Assignee: Subtex, Inc., Hartsdale, N.Y.

[21] Appl. No.: 338,853

[22] Filed: Jan. 12, 1982

Related U.S. Application Data

[63] Continuation-in-part of Ser. No. 294,771, Aug. 20, 1981.

[51] Int. Cl.³ .......................... B32B 7/00; D04B 1/00; B05D 1/00
[52] U.S. Cl. ..................................... 428/246; 427/34; 427/423; 428/251; 428/253; 428/254; 428/284; 428/285
[58] Field of Search ................. 427/34, 423; 428/246, 428/251, 253, 254, 284, 285

[56] References Cited

U.S. PATENT DOCUMENTS

| | | | |
|---|---|---|---|
| 3,016,447 | 1/1962 | Gage et al. | 427/34 |
| 3,669,719 | 6/1972 | Doede et al. | 427/34 |
| 4,076,888 | 2/1978 | Perugini et al. | 427/34 |
| 4,121,082 | 10/1978 | Harrington et al. | 427/34 |
| 4,121,083 | 10/1978 | Smyth | 427/34 |
| 4,173,685 | 11/1979 | Weatherly | 427/34 |
| 4,282,284 | 8/1981 | George | 428/251 |

*Primary Examiner*—William J. Van Balen
*Attorney, Agent, or Firm*—Scully, Scott, Murphy & Presser

[57] ABSTRACT

Refractory coated fabric compositions having a thickness substantially thinner than those prepared heretofore can be provided by forming the refractory coating by a plasma spraying technique.

17 Claims, No Drawings

FLAME RESISTANT INSULATING FABRIC COMPOSITIONS PREPARED BY PLASMA SPRAYING

CROSS REFERENCES TO RELATED APPLICATIONS

This is a continuation-in-part of commonly assigned U.S. patent application Ser. No. 294,771, filed Aug. 20, 1981 and is related to commonly assigned U.S. patent applications Ser. No. 294,770, filed Aug. 20, 1981; Ser. No. 225,888, filed Jan. 19, 1981; Ser. No. 073,362, filed Sept. 7, 1979, now U.S. Pat. No. 4,282,284; Ser. No. 931,121, filed Aug. 4, 1981, now abandoned, and three concurrently filed patent applications, the first relating to a refractory coated/dielectric coated fabric composition, the second relating to a refractory coated/vapor barrier coated fabric composition and the third relating to a refractory coated/conductive layer coated fabric composition.

BACKGROUND OF THE INVENTION

1. Field of the Invention

This invention relates to heat and flame resistant, flexible, insulating fabric compositions. More particularly, it relates to refractory coated porous base fabric compositions and their method of preparation. This invention especially relates to refractory coated porous base fabric compositions wherein the refractory coating is formed on the fabric by plasma spraying.

2. Description of the Prior Art

Asbestos and other thermal protection materials are employed as protective mats for welding operations, furnace linings, fire-resistant linings and the like to provide protection from flames and themal extremes as well as for dissipation of heat at a high rate. Although in each application reasonable performance is obtained, the selected material has limitations in its range of uses and in its effectiveness, even in uses for which it is particularly adapted. In addition, asbestos has found less utility in certain uses because of recent findings that it may constitute a health hazard.

Ceramics and/or glass fibers have been used heretofore to prepare high temperature electrical insulating tape. In addition, coated fabrics and ceramic structures have been prepared with a combination of glass fiber fabrics and metal oxides.

U.S. Pat. No. 4,282,284 and commonly assigned patent applications Ser. Nos. 225,888 and 294,770 disclose a heat resistant, flexible, refractory, insulating fabric composition of a porous base fabric, preferably a knitted fiberglass fabric, coated with heat resistant refractory materials, such as alumina and zirconia, and an organic bonding agent, such as acrylic latex alone or admixed with colloidal silica. A polymeric coating, such as polyvinyl chloride, may be formed over the coated fabric to provide abrasion resistance to the composition. A feature of this composition resides in the fact that the refractory materials are bonded in the interstices as well as to the surface of the base fabric, such that a significant amount of the fabric's flexibility and stretch properties are retained. This fabric composition has a variety of uses and therefore may be employed as the dielectric in insulated electrical wire or cable, as protective mats and curtains in welding operations, as linings for fire resistant machine and appliance covers, as duct and pipe insulation, as wrappings for engine exhaust systems and the like. When this fabric composition is exposed to heat and high temperatures, the organic bonding agent containing the refractory materials will decompose, causing the refractory materials to fuse into the softened surface of the knit fiberglass base fabric, enabling it to withstand intense heat and elevated temperatures well beyond the normal melt temperature of the fiberglass fabric. The resulting fabric structure will have ceramic qualities and will not soften, melt, drip or lose its insulating properties.

Although the organic components of the bonding agent of these prior art fabric compositions may not produce a flame when exposed to a flame or the intense heat developed by a flame, i.e. temperature of 1750° F. and above, they will decompose at these temperatures resulting in some products of combustion in the form of smoke and fumes which may prove harmful to persons in the vicinity.

Commonly assigned patent application Ser. No. 294,771 discloses improved refractory coated fabric compositions which eliminate the products of combustion which may be formed with the fabric compositions described above. These improved fabric compositions are similar to those which produce products of combustion in all respects except that an inorganic bonding agent is substituted for the organic bonding agent of the prior art fabric compositions. When these fabric compositions with the inorganic bonding agent are exposed to high temperatures above about 1750° F., no products of combustion in the form of smoke or fumes are produced.

The refractory coating formed on the prior art compositions of the above commonly assigned patent and patent application is discontinuous so as to provide flexibility to the finished composition. A knitted fiberglass is the preferred porous base fabric of these compositions since the refractory coating impregnates the interstices and coats the outer surface to form a discontinuous layer. A woven fiberglass fabric is not as desirable since a discontinuous layer is more difficult to form on a fabric having a woven configuration.

Although ceramic coated porous fabric compositions prepared with knitted fiberglass are preferred, the thickness of these compositions limits their usefulness. Even when employing a 3½ oz./yd² fiberglass fabric which is made from a D-450-1/0fiberglass yarn, refractory coated compositions prepared by such prior art methods as reverse roll coating are 10–11 mils thick and weigh 7½–8 oz./yd.² A thinner composition would find increased utility in the electrical and aerospace industry where weight is an economic disincentive and space limitations are often a controlling factor. For example, a thinner refractory coated composition would permit the preparation of thinner and lighter insulated electrical conductors.

Plasma spraying is a known coating deposition technique. Coatings of metals, metal alloys, refractory metals and ceramics may be applied to substrates by plasma spraying to provide such desirable properties as wear resistance and corrosion resistance. In plasma spraying a regulated electric arc, developed within a plasma spray gun, excites a stream of inert gas, such as argon or nitrogen, producing within the spray gun a thermal plasma spray at a controllable temperature of 12,000°–30,000° F. Powdered materials are introduced into the plasma where they are heated to a plastic or molten state, then ejected from an orifice on the front of the gun and are imprinted at a very high velocity onto a properly prepared substrate to form a bonded coating. U.S. Pat. Nos. 3,016,477 of Gage et al. and 4,173,685 of Weatherly disclose the plasma spraying of metals and refractory metals onto metallic substrates. U.S. Pat. Nos. 4,121,082 of Harrington et al. and 4,121,083 of Smyth disclose that metals, metal alloys, ceramics, such as metal oxides, and carbides may be plasma sprayed onto a substrate.

Although U.S. Pat. No. 3,669,719 of Doede et al. teaches plasma spraying onto non-metallic and metallic substrates, including such non-rigid materials as glass fiber reinforced plastics and rubber also reinforced with glass fibers, the material being plasma sprayed is always a metal. The plasma sprayed metal coatings of Doede et al. are from about 0.002 to about 0.050; preferably about 0.005 to about 0.025 inches in thickness. U.S. Pat. No. 2,714,563 of Poorman et al. is not related to plasma spraying but discloses the coating of metals, alloys or ceramic materials onto such non-rigid materials as paper, plastic or cloth by detonation gun spraying. Specific examples include coatings of aluminum and zinc onto cotton cloth. Poorman et al. does not suggest that plasma spraying can be used to prepare the same products. U.S. Pat. No. 4,173,685 of Weatherly discloses that a particular coating of nickel base alloys and metal carbides can be applied to a metal substrate by either plasma spraying or detonation gun spraying.

None of these prior art patents teach the application of ceramic materials to a non-rigid substrate such as fiberglass by the coating deposition technique known as plasma spraying.

It is an object of this invention to provide refractory coated fabric compositions having a thickness substantially thinner than those known in the art.

It is another object of this invention to provide a process for preparing refractory coated fabric compositions wherein the refractory coating is substantially thinner than similar compositions prepared by roll coating procedures.

It is a further object of this invention to provide a process for forming 1 to 2 mil thick refractory coatings on porous fiberglass fabrics.

SUMMARY OF THE INVENTION

These and other objects of this invention have been achieved by forming a thin coating of refractory materials on a non-rigid, base fabric by means of plasma spraying.

The present invention relates to a method of preparing a flexible, refractory coated fabric composition which comprises:

(a) developing a thermal plasma spray, (b) introducing finely divided refractory materials into said thermal plasma spray, and (c) directing said thermal plasma spray at the exposed surface of a non-rigid base fabric whereby a coating of said refractory materials is formed on said fabric, said refractory materials being capable of fusing with said fabric at elevated temperatures.

The invention is also concerned with the flexible, refractory coated fabric compositions prepared by the above method.

DESCRIPTION OF THE PREFERRED EMBODIMENTS

The present invention is an improvement over the heat resistant, flexible, refractory, insulating fabric compositions disclosed in commonly assigned U.S. Pat. No. 4,282,284 and patent applications Ser. Nos. 294,771, 294,770 and 225,888, the entire contents of said patent and patent applications being incorporated herein by reference.

Briefly, the fabric compositions prepared in accordance with the present invention differ from those of the commonly assigned patent and patent applications in that the plasma spraying method of preparation disclosed herein produces substantially thinner refractory coated fabric compositions than those of the prior art. Further, although an organic or an inorganic agent comprises part of the refractory coatings in the prior art compositions, no bonding agent is employed to form the refractory coatings in the method of the present invention. Therefore, the resultant compositions not only have the same heat and flame resistance and dielectric properties as the prior art compositions but they do not emit products of combustion in the form of smoke and noxious fumes encountered with those prior art compositions which employ an organic bonding agent in forming the refractory coating.

The porous base fabric employed in this invention should be of a material which is flame resistant, such as fiberglass. Since a woven fabric is thinner that a knitted fabric made from the same yarn, when a thin composition is desirable, a woven fabric fiberglass is preferred. Knitted fiberglass fabrics, such as those described in the above commonly assigned patent and patent applications, and non-woven, porous webs of fiberglass can be refractory coated by plasma spraying but they are not the preferred embodiment of this invention. Satisfactory woven fabric can be prepared from various thin fiberglass yarns prepared from the following fibers:

| Fiber Designation | Nominal Filament Diameter, in. |
|---|---|
| B | 0.00014 |
| D | 0.00021 |
| DE | 0.00025 |
| E | 0.00029 |
| G | 0.00036 |

The D fiber is the preferred fiber designation, however B, DE, E and G fibers may also be used. With a D fiber, the following fiberglass yarn designations are available from which woven fabrics, useful herein, may be prepared:

| Fiber Designation | Yarn Designation | Strands Per Filament | Nominal Yards Per Lb. | Denier |
|---|---|---|---|---|
| D | 1800 1/0 | 51 | 176,400 | 25 |
| D | 900 1/0 | 102 | 88,200 | 50 |
| D | 450 1/0 | 204 | 44,100 | 100 |
| D | 225 1/0 | 408 | 22,050 | 200 |

Another useful material which may be employed in the yarns of the woven or knitted base fabrics of this invention are aramid fibers, particularly Kevlar fibers. Kelvar is an ultra high strength-high modulus fiber. An aramid fiber is a manufactured fiber in which the fiber-forming substance is a long chain polyamide in which at least 85% of the amide linkages are attached directly to two aromatic rings. In Kevlar fibers, the polyamide is poly-para-phenyleneterephthalamide. Not only may woven and knitted fabrics of Kevlar fiber be employed herein but fabrics containing both fiberglass and Kevlar yarns may also be used.

Kevlar yarns are conventionally designated by denier rather than the yarn designation usually employed with fiberglass. Thus a 450 1/0 fiberglass yarn is equivalent to a 100 denier Kevlar yarn.

The preferred woven fabrics employed herein may be a box weave, a twill weave or a leno weave while the knitted fabrics may be either two or three bar. Details of the woven and knit fabrics are set forth below.

| Yarn Designation | Denier | Box Weave Warp yarns/in. | Fill yarns/in. | Twill | Knit 2 or 3 Bar Stitches/in. |
|---|---|---|---|---|---|
| D 75 1/0 | 600 | 30 | 30 | 3:1 or 2:1 | 10 |
| D 150 1/0 | 300 | 60 | 60 | 3:1 or 2:1 | 20 |
| D 225 1/0 | 200 | 120 | 120 | 3:1 or 2:1 | 40 |
| D 450 1/0 | 100 | 240 | 240 | 3:1 or 2:1 | 80 |

Those skilled in the art can appreciate that the thickness of the fabric composition is dependent on the thickness of the fabric and the coatings applied thereto. It can also be appreciated that the end use will often determine the nature of the fabric (woven or knitted), the composition of the yarns (fiberglass yarn, Kevlar yarn or mixture thereof) and the thickness of the fabric and the coating. Where strength is of prime importance, Kevlar fabrics will often provide the base fabric with the requisite properties. The variety of yarns of varying thickness and the weaving and knitting techniques available can provide fabrics in a multiplicity of thicknesses while the plasma spraying can lay down a refractory coating of almost any thickness desired.

Quartz yarns, also described as pure fused silica yarns, can also be utilized in the base fabric employed in this invention. This substrate can withstand severe temperatures. Both woven, knitted or non-woven fabrics of quartz yarn can be plasma sprayed as well as fabrics containing both quartz yarn and Kevlar yarn. Both types of fabric are useful where high temperatures will be experienced.

Ceramic fibers, usually in the form of a non-woven product, such as a web or a paper, find use in this invention, particularly where the resultant products will be exposed to higher temperatures. Alumina silica fibers, alumina fibers, zirconia fibers or mixtures thereof may be used in these webs or papers. Fibers of alumina and zirconia are available from Imperial Chemical Industries, Inc., Great Britain under the tradenames Saffil alumina fiber and Saffil zirconia fiber. The alumina silica fibers are conventionally about 45% alumina and about 52% silica while the alumina fibers are about 95% alumina. The ceramic paper is preferably embossed and perforated before being coated to improve the bonding.

As used herein the term "fabric" includes materials which are woven, knitted, non-woven or otherwise constructed from fibers.

The refractory coating which is plasma sprayed onto the base fabric comprises heat resistant refractory materials. The refractory materials may be any of the usual known refractory materials which will fuse with the base fabric when subjected to elevated temperatures, e.g., above about 1250° F. for fiberglass. It will be appreciated that the refractory materials may be in any form suitable for plasma spraying such as for example, a solid wire or rod. However, powder, i.e., finely divided material, is preferable. The powder may be free flowing or in a binder such as a plastic bonded wire or the like, for example. The powdered material should have a particle size between about 10 and about 200 microns, preferably between about 20 and about 50 microns. Useful refractory materials include compounds of aluminum, calcium, chromium, magnesium, silicon, titanium, zirconium and the like, such as aluminum oxide, calcium oxide, magnesium oxide silicon oxide, titanium oxide, zirconium oxide, aluminum silicate, calcium silicate, magnesium silicate, silicon carbide, zirconium carbide, alumina silica fiber and the like. Alumina, zirconia, calcium silicate and silicon dioxide are preferred, alone or in combination. These materials enable the compositions of this invention to maintain their heat insulating abiltiy during prolonged exposure (about 20 minutes) to temperatures in the 1800°-2000° F. range.

In addition to these ceramic-type materials, other useful refractory materials may be employed to provide compositions which will withstand thermal shock at temperatures in the 4000° F. plus range. These refractory materials include, for example, zirconium oxide, silicon carbide, and thermal carbon black. This latter material is a non-electrical conducting form of carbon black which is resistant to thermal shock temperatures as high as 7000° F.

Plasma spraying is a known technique for applying a coating to a substrate. Any of the commercially available plasma spraying equipment may be employed, for example an Avco Plasma Spray System equipped with a Plasmadyne powder feeder or any of the spray equipment manufactured by Metco, Inc. The plasma and carrier gas may be nitrogen, argon, helium and even hydrogen or air. In general, the spraying of metals requires a reducing atmosphere whereas when spraying ceramics, it is desirable to provide an excess of oxygen. The amount of gas required is usually about 2 to about 20 SCF per pound of material sprayed at a pressure of about 40 to about 100 psig. The plasma spray gun is operated at about 200 to about 600 amperes at voltages ranging from about 20 to 150 DC., preferably about 275 to about 500 amperes at voltages ranging from about 20 to about 100 DC. The distance from the nozzle of the plasma spray gun to the surface of the fabric substrate may be varied depending on the thickness of the film and the feed rate of the gas and the refractory materials but generally varies from about 1 to about 6, preferably about 2 to about 4 inches.

The compositions prepared in accordance with this invention may be prepared with refractory coatings of varying thickness. A principal advantage of the present procedure of utilizing plasma spraying is to permit the preparation of substantially thinner refractory coated fabric compositions than those prepared heretofore. Therefore, it is possible, in the practice of this invention, to form refractory coating as thin a 1 mil on a base fabric such as fiberglass. In general the refractory coatings of this invention will be from about 1 to about 10, preferably from about 1 to about 3 mils in thickness. The overall thickness of the final product will, therefore be dependent on the thickness of the porous base fabric, whether the plasma sprayed refractory coating is formed on one or both sides of the fabric and the thickness of the individual refractory coatings.

It is possible with the plasma spraying technique utilized in this invention to provide refractory coatings over a range of densities. With most of the refractory materials a light density coating is satisfactory since it has good thermal properties as well as being obviously more economical and providing a lighter weight product than a heavier density coating. Although a heavier density refractory coating has better electrical properties than a light density layer it does not necessarily have better thermal properties. In a preferred embodiment, where a knitted fiberglass is serving as the base fabric, a light density refractory coating is plasma sprayed into the interstices of the knit fabric and than a heavier density layer is laid down over that. This coating provides the composite features of a light and a heavy density coating.

Where the fabric composition will be subject to abrasive forces at ambient temperatures, a polymeric coating, as described in the above commonly assigned patent and patent applications, may be applied over the refractory coating. In preferred embodiments, polyimide resin, polyamideimide resin or polyester resin is emloyed as the polymer coating instead of the polyvinylchloride disclosed in said patent and patent applications. This polymeric coating may be applied at a coating density of approximately 2 ounces per square yard, based on dry net weight, to improve the surface abrasion qualities of the fabric and to seal in and contain any refractory materials that may otherwise loosen from the fabric as it is stretched in the wire and/or cable wrapping process or subject to abrasion in use.

Where a refractory coating is formed on both sides of the porous base fabric, the polymeric coating may be applied to both surfaces of the refractory coating or, optionally, to only one surface, particularly where a flame-proof adhesive is to be applied to the other surface of the refractory coating.

The polymer used in the polymeric coating should remain flame resistant until carbonization occurs. Polyvinyl chloride resin is one polymer which may be used in the polymeric coating. This coating is a mixture of selected plasticizers, stabilizers and modifiers, dispersion resins and oxides. A number of components are cmbined with the polyvinyl resin to provide the required properties of high temperature resistance and flexibility. One such polyvinyl chloride resin formulation is described in the above commonly assigned patent and patent applications which have been incorporated herein by reference. However, the preferred resins for the polymer coatings applied to the compositions of this invention are a polyimide resin, a polyamideimide resin or a polyester resin. The first two are available from Rhone-Poulenc Chemical Co. of Monmouth Junction, N.J. under the tradenames Kermid 500 and Rhodeftal 200, respectively.

Where an adhesive is to be applied to the refractory coating to adhere the fabric composition to, for example, an electrical wire or a surface requiring heat and flame protection, the flameproof tape wrapping adhesive disclosed in U.S. Pat. No. 4,282,284 may be employed.

The fabrics prepared in accordance with this invention may be employed in the same manner as those disclosed in the commonly assigned patent and patent applications referred to hereinbefore. Thus, they may serve, for example, as electrical insulating tape, welding curtains and mats, pipe and dust insulation, fire resistant linings, valve packing and the like where a material is required which is capable of enduring high temperatures and providing thermal protection and/or dielectric properties.

What is claimed is:

1. A method of preparing a flexible refractory coated fabric composition which comprises:
   (a) developing a thermal plasma spray,
   (b) introducing finely divided refractory materials into said thermal plasma spray, and
   (c) directing said thermal plasma spray at the exposed surface of a non-rigid base fabric whereby a coating of said refractory materials is formed on said fabric, said refractory materials being capable of fusing with said fabric at elevated temperatures.
2. A method according to claim 1 wherein the coating of said refractory materials has a thickness of between about 1 and about 10 mils.
3. A method according to claim 2 wherein the thickness is between about 1 and about 3 mils.
4. A method according to claim 1 wherein the coating of refractory materials comprises a light density layer and a heavier density layer.
5. A method according to claim 1 including the following additional step:
   (d) forming an abrasion resistant polymeric coating on the outer surface of said coating of said refractory materials.
6. A method according to claim 1 including the following additional step:
   (e) applying an adhesive to the outer surface of said coating of said refractory materials.
7. A method according to claim 1 wherein the coating of said refractory materials is formed on both sides of said fabric.
8. A method according to claim 7 including the following additional steps:
   (f) forming an abrasion resistant polymeric coating on the outer surface of one of the coatings of said refractory materials, and
   (g) applying an adhesive to the outer surface of the other coating of said refractory materials.
9. A method according to claim 1 wherein the non-rigid base fabric is a woven fabric.
10. A method according to claim 1 wherein the non-rigid base fabric is a knitted fabric or a non-woven web.
11. A method according to claim 9 wherein the base fabric is made from fiberglass yarn, Kevlar yarn or a mixture of fiberglass yarn and Kevlar yarn.
12. A method according to claim 10 wherein the base fabric is made from fiberglass yarn, Kevlar yarn or a mixture of fibeglass yarn and Kevlar yarn.
13. A method according to claim 1 wherein the refractory materials are alumina, zirconia, calcium silicate, silicon dioxide or mixtures thereof.
14. A method according to claim 1 wherein the refractory materials are silicon carbide, or thermal carbon black.
15. A method according to claim 1 wherein the base fabric is woven, knitted or non-woven and is made from quartz yarn or a mixture of quartz yarn and Kelvar yarn.
16. A method according to claim 1 wherein the base fabric is a non-woven web or paper of alumina silica fibers, alumina fibers, zirconia fibers or mixtures thereof.
17. A refractory coated fabric composition prepared according to the method of claims 1, 2, 3, 4, 5, 6, 7, 8, 9, 10, 11, 12, 13, 14, 15 or 16.

* * * * *